Aug. 7, 1928.
J. H. VIEWEGH
1,680,185
METAL BASE BIRD CAGE
Filed May 25, 1927
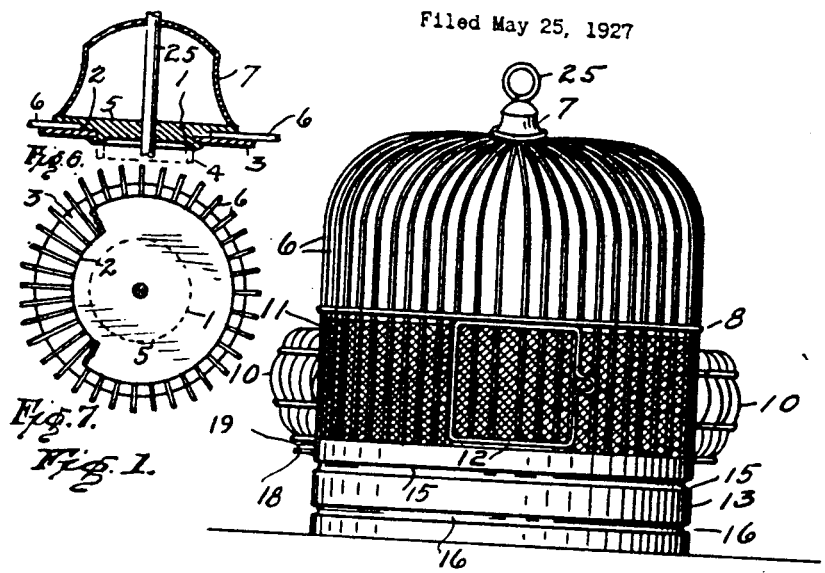
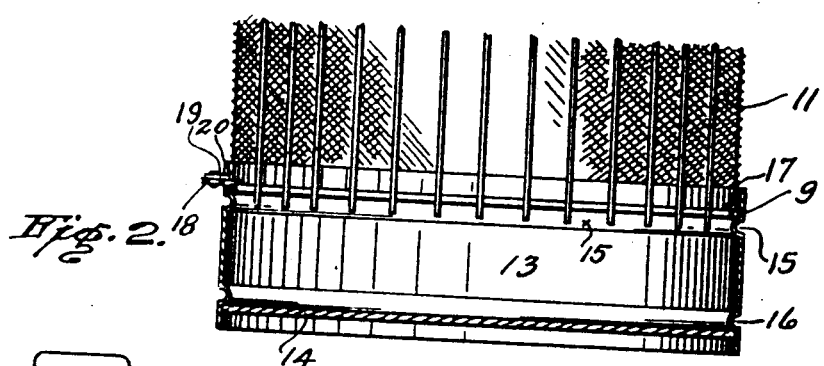
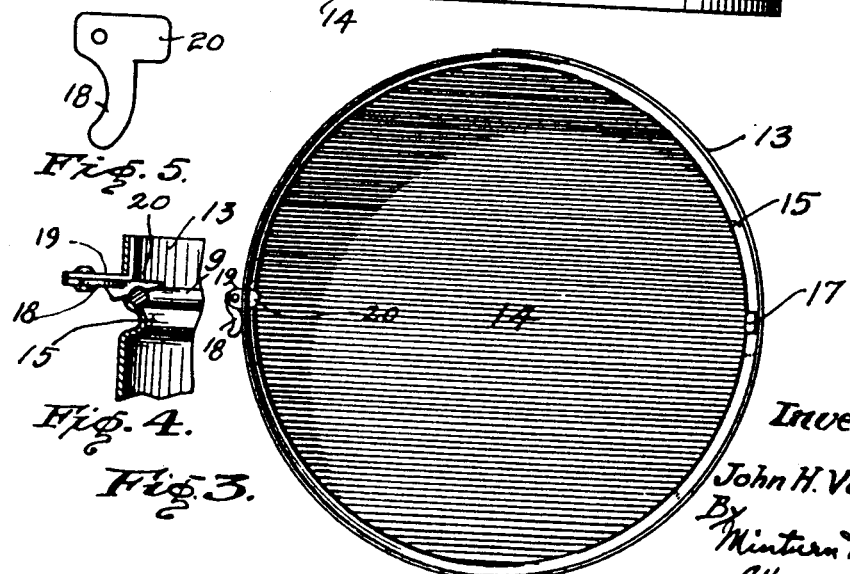
Inventor,
John H. Viewegh,
By Minturn & Minturn,
Attorneys.

Patented Aug. 7, 1928.

1,680,185

UNITED STATES PATENT OFFICE.

JOHN H. VIEWEGH, OF INDIANAPOLIS, INDIANA.

METAL-BASE BIRD CAGE.

Application filed May 25, 1927. Serial No. 194,176.

This invention relates to improvements in bird cages and has particular reference to the construction of the top, the bottom and the lower sides of such cages.

The object of the invention is so to secure the upper ends of the wire bars comprising the top and upper sides of the cage that they will be supported and will not come loose by use, as has been the difficulty heretofore, and to utilize the holding means as a secure anchorage for a perch-holding and cage suspension eyebolt.

A further object of the invention is to provide a bottom and lower sides so intimately joined that they will form a water tight receptacle, so that water splashed by the bird in bathing will be retained in the cage, together with seeds and other refuse so commonly thrown by the bird as to make the room untidy in which the cage is located.

Another object is to provide a convenient, durable and reliable fastening means for removably securing the bottom and its fixed sides to the superimposed bar open work structure of the cage.

I accomplish the above and other minor objects which will hereinafter appear, by the mechanism illustrated in the accompanying drawing, in which—

Fig. 1, is a view in side elevation of a bird cage embodying my invention;

Fig. 2, is a vertical central section on a larger scale of the lower part of the cage shown in Fig. 1, through the seed cups, which are omitted in this view;

Fig. 3, is a top plan view of the removable base, detached from the upper portion of the cage;

Fig. 4, is a detail on a larger scale of the locking cam shown in Fig. 2;

Fig. 5, is a top plan view of the cam lever detached;

Fig. 6, is a vertical section of the dome and its base plates for the attachment of the wire bars of the cage; and Fig. 7, is a top plan view of same with the dome removed and showing the base plate broken away in part.

Like characters of reference indicate like parts in the several views of the drawing.

The cage-top and a major portion of the cage-sides are formed of wire bars 6, radiating from the base of a dome 7. This base comprises a metal disc 5, reduced in thickness near the edge to form a shoulder 2, as an abutment for the ends of the wire 6, and again reduced to form an annular shoulder 1 which centers an annular plate 3 to which the ends of the bars 6 are soldered. The disc 5 is extended to form a depending flange 4, shown by dotted lines in Fig. 6, and after the bars 6 and plate 3 are assembled the assembly is retained by swaging the flange out against the plate 3 as shown in Fig. 6. The proportions are such that the bars 6 are firmly clamped between the plates 5 and 3. The usual eye-bolt 25 passes through dome 7 and plate 5. It is formed with an eye 25 at its upper end while to the lower end of the bolt a perch is attached in the usual manner, not shown.

The bars 6 are spaced apart and are held by horizontal outside wires 8 and 9.

A pair of food cups 10, 10, are attached to the side bars of the cage in the usual manner and a wire cloth 11 is applied to the bars as a guard to the height of the food cups to prevent scattering of seeds and the like. A door 12 of usual construction is also provided.

The superstructure as above described is removably assembled in a base member of sheet metal comprising a cylinder or drum 13, and a circular bottom plate 14.

Formed in the drum 13 are two annular inwardly projected beads or corrugations 15 and 16. The bottom plate 14 contacts the lower side of the corrugation 16, and is preferably soldered to the corrugation and metal sides to make such a water tight joint that liquids in the hollow base will not leak out.

The ring 9 of the wire superstructure of the cage is of a diameter to make an easy fit between the walls of the base, and the superstructure is assembled with the wire 9 resting upon the upper corrugation 15. It is hooked under a fixed lug 17, projecting inwardly from one side of the base, and is locked on the other side by a swinging lever 18. The lever 18 is pivoted to and under an outside ear 19. It has an end 20 adapted to swing through a slot in the wall of the base across the top of the wire 9 when the wire is on corrugation 15. The under face of end 20 is beveled to wedge the wire 9 firmly against corrugation 15, and to prevent accidental withdrawal of the end 20 the bevelled face is recessed to receive the wire. There is spring enough in the wire and superstructure to cause the wire to move down under the wedge action of end 20 and snap into the recess in the sloping face of end 20. The extension 18 serves as a handle for manipulating the catch. When the catch is withdrawn the sheet metal lower portion of the cage will swing down and is then readily removable for cleaning purposes. The superstructure with the bird in it is set on a table, floor, or other flat surface to prevent the escape of the bird while the base member is removed.

Having thus fully described my invention, what I claim as new and wish to secure by Letters Patent, is—

1. In a bird cage, the combination with a spaced apart wire superstructure having an outside horizontal wire ring attached to the outer side thereof near its lower end, of a sheet metal base member comprising a drum and a bottom water tight closure for the drum, said drum having an inside circular corrugation near its open end, the wire superstructure being inserted in the drum with its horizontal wire ring resting upon the corrugation, and means for removably securing the ring against the corrugation.

2. A base-member for bird cages comprising a sheet metal drum having an annular inturned corrugation near its top and bottom edges, a metal disk inserted in the drum under and against the bottom corrugation, and means for making a water tight joint between the disk and drum, in combination with a cage superstructure seated in the drum upon the top corrugation, and means for retaining that assembly.

3. In a bird cage, the combination with a wire superstructure having a horizontal wire ring near its lower end, of a base member comprising a sheet metal drum having an annular inturned corrugation near its top edge into which base member the superstructure is inserted with its wire ring contacting the corrugation of the base member, projections from the drum above the corrugation, under which the wire ring is inserted and a movable catch on the other side of the drum to engage the ring between it and the corrugation and lock the superstructure to the base member.

4. In a bird cage, the combination with a wire superstructure having a horizontal wire ring near its lower end, of a base member comprising a sheet metal drum having an annular inturned corrugation near its top edge into which base member the superstructure is inserted with its wire ring contacting the corrugation of the base member, projections from the drum above the corrugation, under which the wire ring is inserted, and a lever pivoted to the opposite side of the base said lever having an arm adapted to be moved over the wire ring, the contacting side of said arm being oblique to the ring to clamp the ring against the corrugation.

5. In a bird cage, the combination with a wire superstructure having a horizontal wire ring near its lower end, of a base member comprising a sheet metal drum having an annular inturned corrugation near its top edge into which base member the superstructure is inserted with its wire ring contacting the corrugation of the base member, projections from the drum above the corrugation, under which the wire ring is inserted, and a lever pivoted to the opposite side of the base said lever having an arm adapted to be moved over the wire ring, the contacting side of said arm being oblique to the ring to clamp the ring against the corrugation, and means to lock the arm to the ring.

6. In a bird cage, the combination with a bottom, sides and top, said sides and top comprising a plurality of bars converging toward a middle line at their upper ends, an annulus to which the ends of the bars are soldered, a disc contacting the bars on their opposite sides from the annulus said disc having an annular shoulder against which the ends of the bars contact and having a flange passed through the annulus and bent to clamp and hold the bars between the annulus and the disc.

In testimony whereof I affix my signature.

JOHN H. VIEWEGH.